(12) United States Patent
Burke (10) Patent No.: US 7,661,088 B2
(45) Date of Patent: Feb. 9, 2010

(54) SYSTEMS AND METHODS TO EFFICIENTLY AND AUTOMATICALLY EFFECT POPULATION OF CUSTOM CONTROLS ONTO A VISUAL DESIGNER TOOLBOX

(75) Inventor: Shawn P Burke, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 378 days.

(21) Appl. No.: 10/970,416

(22) Filed: Oct. 20, 2004

(65) Prior Publication Data

US 2006/0101396 A1 May 11, 2006

(51) Int. Cl.
*G06F 9/44* (2006.01)
*G06F 3/00* (2006.01)
*G06F 3/048* (2006.01)

(52) U.S. Cl. .................. 717/105; 717/104; 717/109; 717/113; 717/120; 717/125; 715/762; 715/763

(58) Field of Classification Search .......... 717/104, 717/105, 109, 120–123; 715/810, 841, 762, 715/763
See application file for complete search history.

(56) References Cited

U.S. PATENT DOCUMENTS

| 5,872,974 | A  | * | 2/1999 | Mezick | 717/109 |
| 6,275,223 | B1 | * | 8/2001 | Hughes | 715/751 |
| 7,197,743 | B2 | * | 3/2007 | Borg et al. | 717/120 |
| 7,231,631 | B1 | * | 6/2007 | Branch Freeman et al. | 717/108 |
| 2003/0135841 | A1 | * | 7/2003 | Ambrose et al. | 717/120 |
| 2004/0261059 | A1 | * | 12/2004 | Spencer et al. | 717/120 |
| 2005/0066304 | A1 | * | 3/2005 | Tattrie et al. | 717/101 |
| 2005/0262480 | A1 | * | 11/2005 | Pik et al. | 717/120 |
| 2005/0262481 | A1 | * | 11/2005 | Coulson | 717/120 |
| 2006/0015850 | A1 | * | 1/2006 | Poole | 717/120 |
| 2006/0080639 | A1 | * | 4/2006 | Bustelo et al. | 717/111 |
| 2006/0259871 | A1 | * | 11/2006 | Washington et al. | 715/763 |

OTHER PUBLICATIONS

Shigesada, Design of VACL: a visual script language system which controls and extends applications on a graphical user interface environment, IEEE, Dec. 1996, pp. 104-114.*
Zhengbin et al., A visual programming tool for user interface and Web page generation, IEEE, Sep. 1998, pp. 181-185.*
Lu et al. Modelling visual attention and motion effect for visual quality evaluation, IEEE, Oct. 2004, pp. 2311-2314 vol. 4.*
O'Toole et al., Graphical Programming Environment for ATLAS, 1997, IEEE, pp. 488-491.*

* cited by examiner

*Primary Examiner*—Wei Y Zhen
*Assistant Examiner*—Satish Rampuria
(74) *Attorney, Agent, or Firm*—Workman Nydegger (57) ABSTRACT

The subject invention provides for a system and/or methodology that automatically effects populating a visual designer toolbox with predefined custom controls. In accordance with aspects of the subject invention, a user (or application) can program a binary definition of a desired custom control. The subject invention can scan the binary to identify the control and transfer the control onto the toolbox. Once populated onto the toolbox, a user can quickly and easily transfer (e.g., click and drag) the controls onto a form within a project as desired.

27 Claims, 9 Drawing Sheets

SYSTEMS AND METHODS TO EFFICIENTLY AND AUTOMATICALLY EFFECT POPULATION OF CUSTOM CONTROLS ONTO A VISUAL DESIGNER TOOLBOX

TECHNICAL FIELD

This invention is related to computer systems and more particularly to a system and/or methodology to efficiently and automatically effect population of custom controls onto a visual designer toolbox.

BACKGROUND OF THE INVENTION

With respect to conventional computing environments (e.g., ActiveX Controls on Windows brand operating systems), in order for a programmer to create custom components, extensive knowledge of programming languages (e.g., C) is required. The advent of higher-level abstraction, object oriented (OO) environments (e.g., .NET Framework brand APIs) make it considerably easier to create custom components. However, utilizing these components in visual design environments (e.g., the .NET Framework brand Windows Forms Designer in a Visual Studio.NET brand development tool). In other words, the process of using these custom components has been somewhat cumbersome and not designer friendly.

With the introduction of the frameworks (e.g., .NET Framework brand framework), more and more users are exposed to object oriented design principals. One of these principles is inheritance. Inheritance makes it easy to create components that "inherit" the behavior and attributes of existing components in the system. Accordingly, as part of designing software built with the object oriented framework, it is common to create a new component that inherits or "derives from" an existing component. Within the existing visual designer environments (e.g., Visual Studio .NET versions 1.0 and 1.1 brand designers), in order to make controls available to be utilized within the visual designer, the user must navigate through several non-intuitive steps to populate the components onto the toolbox so that they can be placed within the visual design surface.

For example, in accordance with traditional systems, once a new control is built, the user opens an add/remove dialog box to add the new component to the toolbox. The add/remove dialog box is employed to identify desired controls. Often, the use of the dialog box requires knowledge of the location of the newly built control dynamic-link library (DLL). If not already available, a user must "browse" to locate the correct path to the control, and this location may not always be obviously apparent to all users.

Once the library is identified, any components within will be added to the list of available controls on the system. The user must then select with components(s) within the DLL to add to the toolbox. The add/remove dialog box may then be closed and the selected components or controls will be added to the toolbox. Finally, the control can be dragged from the toolbox to the form as desired. Clearly, this is a cumbersome process involving many time consuming non-intuitive steps.

What is needed is a system and/or methodology that can streamline and automate this toolbox population process. In other words, a substantial need exists for a system and/or methodology whereby upon building components (e.g., controls), automatic population of the toolbox is effected. Such a system would encourage a user to create custom components whereby they can be easily consumed and utilized from within the design time environment (e.g., toolbox). An additional need exists for a system that can automatically harvest all components (e.g., controls) within a system thus automatically (or selectively) inserting the identified components onto the toolbox for subsequent use and/or reference.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, comprises a system and/or methodology that automatically effects populating a visual designer toolbox. The automatic population can effect the transfer of custom controls onto a visual designer toolbox thus making the controls readily available to a user of the visual designer. In accordance with an aspect of the subject invention, a user can define a desired custom control directly within the source code. Once programmed, a build can be effected thus generating binary code. The subject invention can be employed to interrogate the binary code to identify usable components and subsequently automatically transfer the components onto the toolbox. Once populated onto the toolbox, a user can quickly and easily apply (e.g., click and drag) the control(s) onto a form within a project as desired.

In another aspect of the invention, a system that facilitates populating a visual designer toolbox is provided. The system can include a tracking module that tracks a project system for an indication that a program has been built. In other words, the tracking component can identify that a binary has been built and is complete. Upon detecting the indication that a binary is complete, an inspection module can be employed to inspect the program for a component (e.g., control) that can be placed on the visual designer toolbox. Finally, a population module that automatically places the component into the visual designer toolbox can be provided.

A notification module can be employed to generate the indication (e.g., prompt, alert) that a binary build is complete. Alternatively, the system can employ a pre-defined timing sequence to effect the tracking and/or inspection to identify appropriate controls. It will be appreciated that the program is a binary code generated from source code. It is to be understood that the system can be employed with any type of code (e.g., source, binary, assembly, machine). In other words, in one alternate aspect, the subject invention can be employed by directly parsing source code to identify controls that can be automatically populated into a toolbox. As well, it is to be understood that alternate aspects of the system can employ code whether human or machine generated.

In yet another aspect, the system can include an analyzing module that analyzes the component (e.g., control) with respect to the toolbox inventory. In other words, the analyzing component can be employed to determine a state (e.g., version) of the component whereby the system can deduce modification, replacement and/or deletion of an existing toolbox control. For example, if the user changes the name of a component in source code and generates a new binary, the analyzing component can automatically and correctly update the entries on the toolbox. The analyzing component is also able to deduce relationships between types of components and designers to ensure that the user is prevented from creating invalid relationships. For example, components can be declared as public (e.g., accessible from code not in the same binary as the component) or private to the declaring binary. The analyzing module is able to determine which designers represent objects present within the same binary as the component and allows those toolbox items to be used in that context. Conversely, it prevents those toolbox items from being dropped on other designers that operate on code outside the component's binary.

Other aspects employ a rule-based decision mechanism to populate the toolbox in accordance with a predetermined criteria (e.g., rule). Yet another aspect employs an artificial intelligence-based (AI-based) inference (e.g., utility or statistical based analysis) mechanism to populate the toolbox in accordance with a predicted or inferred criteria. It is to be understood that other aspects can employ a combination of rule-based and AI-based mechanisms to automate an action in connection with the invention.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention can be practiced without these specific details. In other instances, well-known structures and devices are shown in block diagram form in order to facilitate describing the subject invention.

As used in this application, the terms "component", "module" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The subject invention provides for a system and/or methodology that automatically effects populating a visual designer toolbox with predefined custom controls. In accordance with aspects of the subject invention, a user (or application) can program a binary definition of a desired custom control. The subject invention can inspect the binary to identify the appropriate components and transfer those components onto the toolbox. Once populated onto the toolbox, a user can quickly and easily transfer (e.g., click and drag) the controls onto a form within a project as desired.

Figure 1:
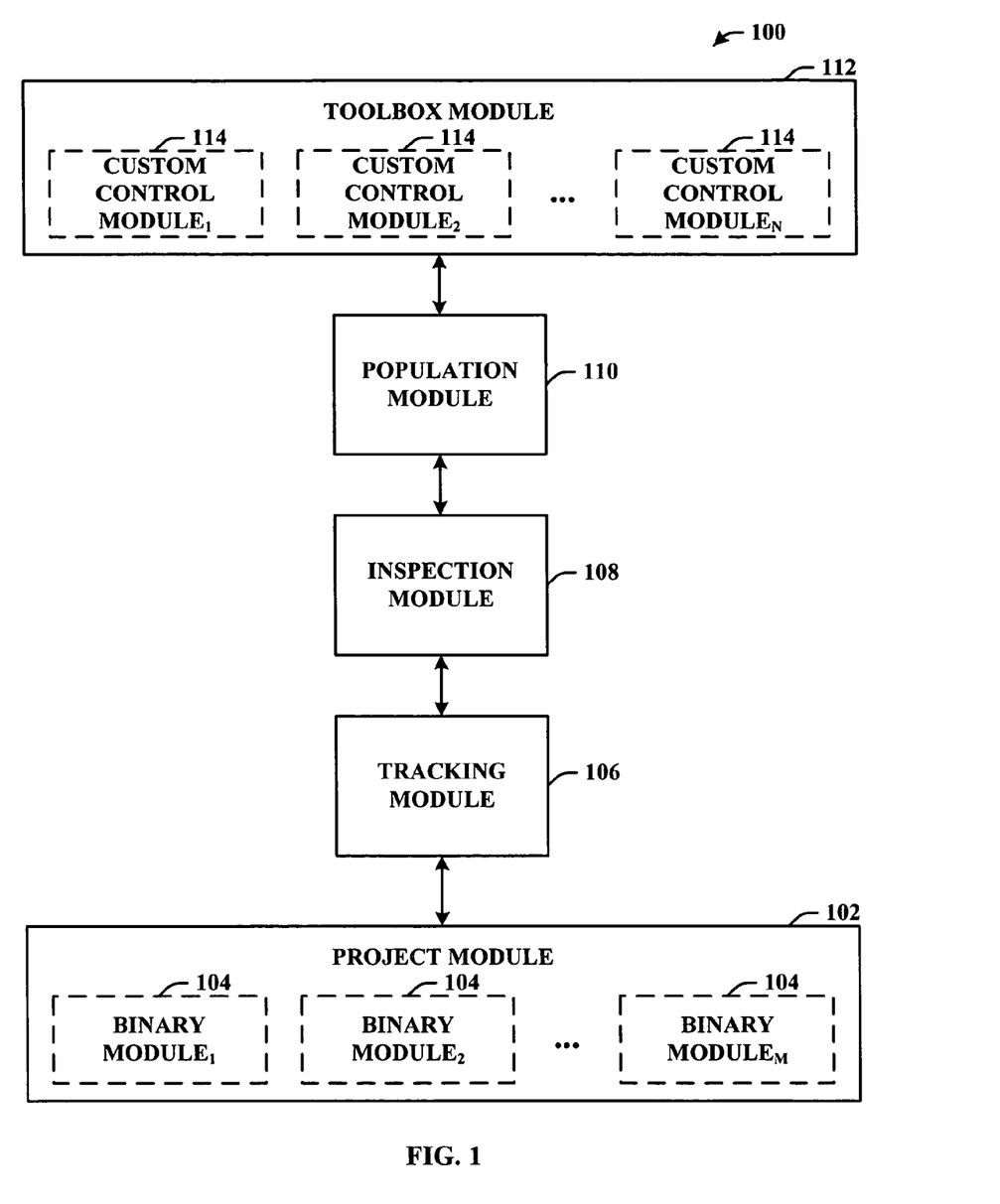
FIG. 1 illustrates a general component block diagram of a system for populating a toolbox in accordance with an aspect of the subject invention.

Referring now to FIG. 1, there is illustrated a schematic representation of an aspect of a system 100 that facilitates identifying and moving components (e.g., controls) onto a design staging area (e.g., toolbox) in accordance with the subject invention. Generally, the system 100 can include a project module 102 having binary modules 104 therein. The system can further include a tracking module 106, an inspection module 108, and a population module 110. Moreover, the system can include a toolbox module 112 having custom control modules 114 therein.

The project module 102 can include M binary modules, where M is an integer. The binary modules can be referred to collectively or individually as binary modules 104 as illustrated. In accordance with an aspect of the subject invention, a user can manually generate the binary modules 104 as desired. By way of example, the user can manually generate a binary module to establish a desired component (e.g., control, button). It will be appreciated that the binary modules 104 can alternatively be pre-defined or automatically generated by a component or application.

The tracking module 106 can listen to or track the project module for programs (e.g., binary modules 104) that have been built. In an alternate aspect discussed in greater detail infra, an optional notification component (not shown) can be employed to effect a notification or prompt. This notification and/or prompt can alert the tracking component of a program that has been built. As well, the tracking component 106 can automatically search for new (and old) binaries.

Once identified, the inspection module 108 can effect interrogation of the binaries 104 to identify any controls that can be placed onto the toolbox. It is to be appreciated that the inspection module 108 can identify new and existing controls. In other words, it will be understood that the inspection module 108 can identify new controls that should be served to the population module 110. As well, the inspection module 108 can identify and determine a current state (e.g., version) of an existing control. Accordingly, the inspection module 108 can determine if a change in an existing control occurred as a result of an identified binary module 104.

Once the controls (e.g., new and existing), have been identified, the population module 110 can effect transfer onto the toolbox module 112. As illustrated, the toolbox module 112 can include N custom control modules, where N is an integer. The custom control modules can be referred to collectively or individually as custom control modules 114 as illustrated. In an alternate aspect, the population module 110 can include an update module (not shown) that prompts a user (or application) of a change in the toolbox module 112 inventory. For example, the population module 110 can be configured to prompt a user prior to inserting a new custom control module 114 onto the toolbox module 112. In another aspect, the population module 110 can prompt a user of any update of a custom control module 114. In yet another aspect, the population component 110 can delete a custom control component(s) 114 in accordance with an update effected by the project module 102 and corresponding binary modules 104. In other words, the population component 110 updates the toolbox module 112 inventory with custom control modules 114 as appropriate with respect of code changes.

Additionally, an artificial intelligence (AI) component can be employed individually or in combination with other decision making schemes (e.g., rule-based) in order to effect automatic population based on an inference of a user intention with respect to a characteristic of the control as a function of the project. These alternative aspects will be described in greater detail with respect to FIGS. 7 and 8 infra.

When a toolbox item (e.g., custom control module 114) is chosen for a component defined in the solution or project 102, the system 100 can on-demand load the proper binary containing the component. The on-demand loading can effect the type to be instantiated. Further, because some systems (e.g., VS.NET Project brand systems) do not allow references to executable (.exe) projects, the system 100 can ensure that toolbox 112 items (e.g., controls 114) from .exe projects cannot be dropped on other projects, but can be dropped on designers within the same exe project. However, the system can support references dynamic link library (.dll) projects, so components defined within those projects can be dropped on designers for other projects.

Figure 2:
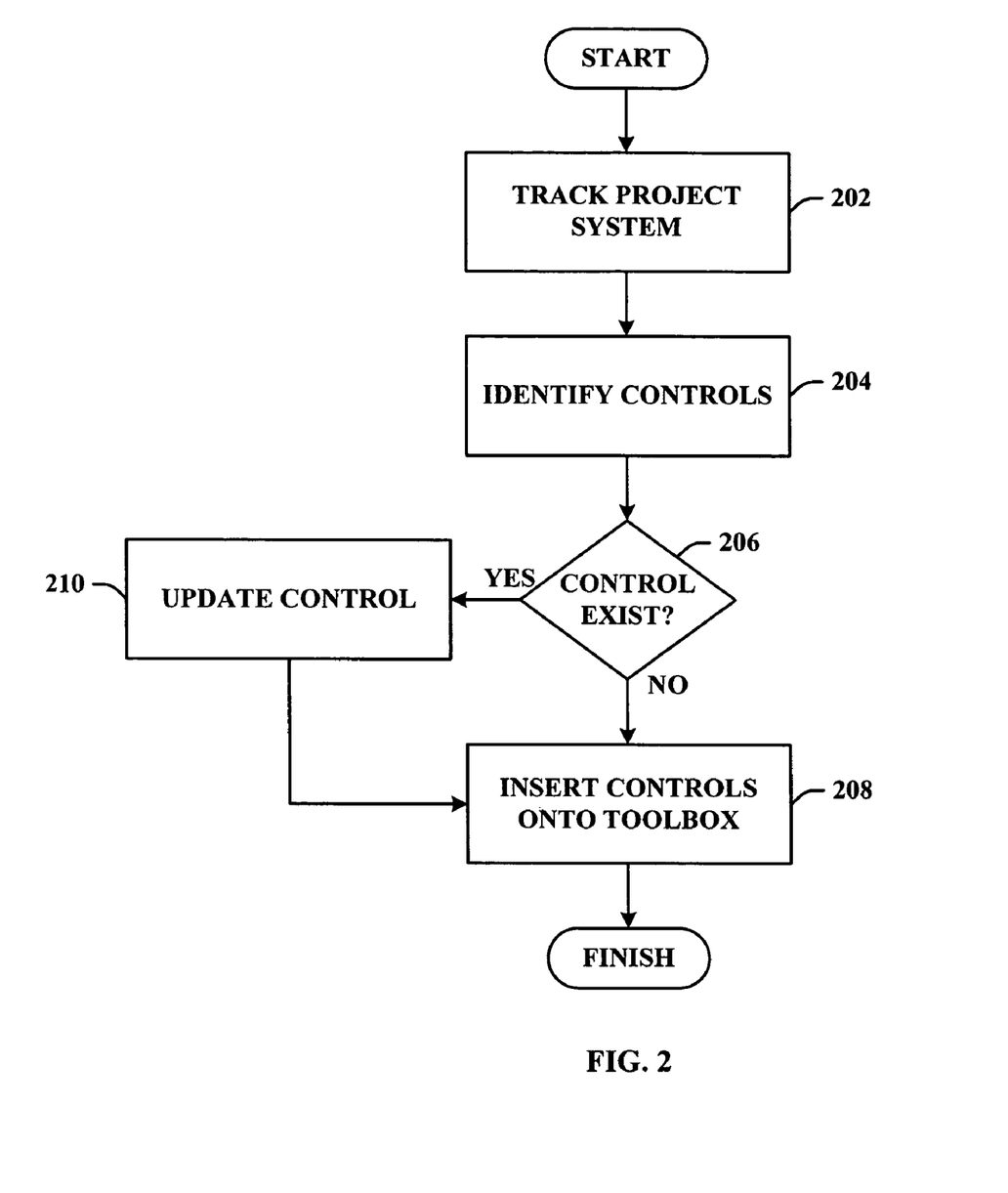
FIG. 2 illustrates an exemplary flow chart of procedures to transfer a custom control onto a visual designer toolbox in accordance with a disclosed aspect.

Referring now to FIG. 2, there is illustrated an exemplary flow chart in accordance with an aspect of the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Turning now to FIG. 2, at 202 the system can track a solution or project system to identify when a binary build is complete. As discussed supra, the system can be configured to automatically listen or track for a build to complete. As well, the system can be employed in an on-demand manner whereby, an interrogation of a solution or project can occur upon a trigger. It will be appreciated that a user or component can effect the trigger.

Once a binary (or set of binaries) have been identified at 202, the controls can be identified in accordance thereto at 204. In other words, the binaries identified at 202 can be interrogated at 204 in order to identify any component(s) capable of being placed onto the visual designer toolbox. It will be understood that these components can be of any type known in the art.

At 206, the system determines if the identified control(s) currently exist on the toolbox. If the identified controls do not exist on the toolbox, at 208, the controls can be applied (e.g., populated) onto the toolbox. If however, at 206 it is determined that the identified controls do exist, the system can update the control at 210. Once updated, the updated version can be populated onto the toolbox at 208, as illustrated. As described supra, it will be appreciated that the control inventory of the toolbox can be updated whereby controls can be added, revised and/or deleted from the inventory as appropriate.

Figure 3:
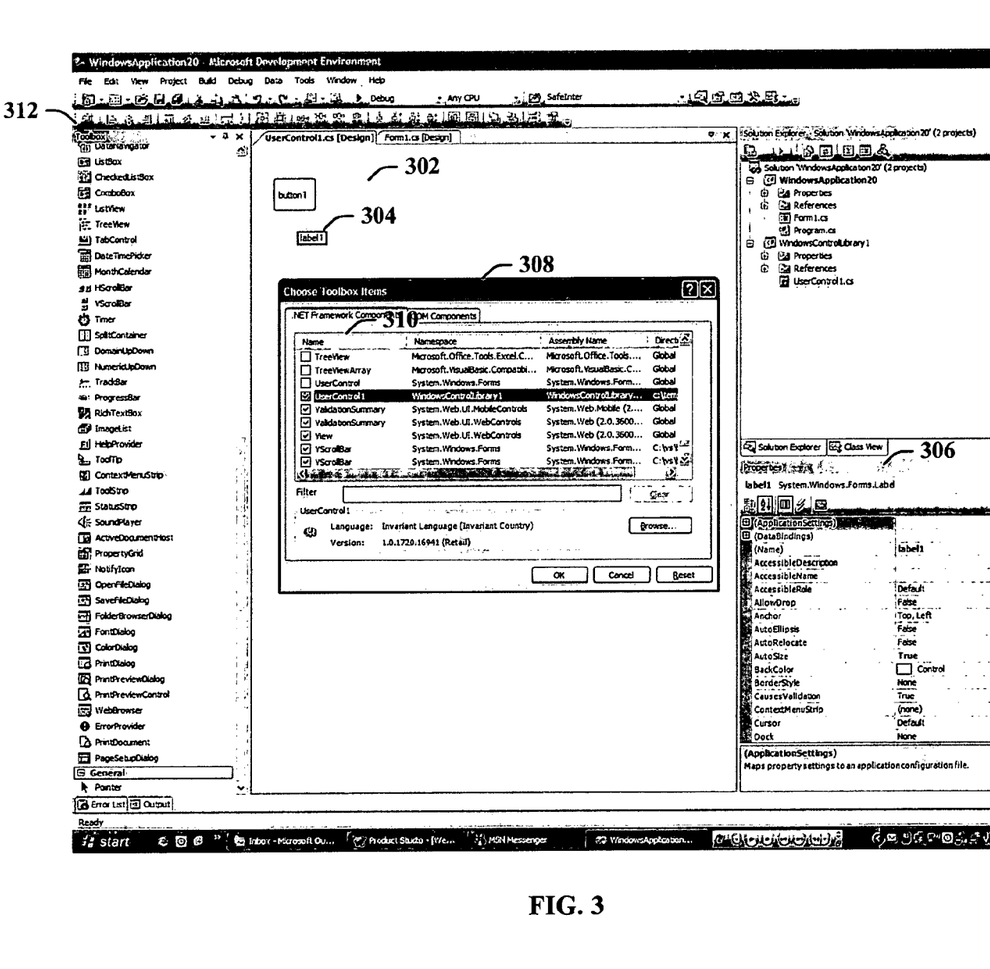
FIG. 3 illustrates a graphical user interface (GUI) that exemplifies a toolbox population technique in accordance with an aspect of the invention.

With reference now to FIG. 3, there is illustrated an exemplary user interface (UI) graphical description that provides context to aspects of the subject invention. While, for purposes of simplicity of explanation, the one or more UI's shown herein, e.g., in the form of a UI graphical description, are shown and described as an exemplary arrangement. It is to be understood and appreciated that the subject invention is not limited to any characteristics of the UIs, as some characteristics may, in accordance with the subject invention, appear differently from those shown and described herein. Moreover, not all illustrated characteristics may be required to implement the subject invention.

Referring now to FIG. 3, there is illustrated an exemplary UI screen print to provide context of aspects of the subject invention. More particularly, the UI of FIG. 3 illustrates some of the aspect automated by the subject invention. For example, illustrated in the UI of FIG. 3, a design surface 302 includes custom control "Label1" 304. The properties of custom control "Label1" 304 are illustrated at 306. For example, the "Name" is identified as "Label 1." Correspondingly, the name "Label 1" from the properties grid 306 appears in the visual representation of control 304 on the design surface 302. Once the new control (e.g., 304) is created, the user can open an add/remove dialog box. The add/remove dialog box 308 can be employed to identify a desired control (e.g., 304).

The system can next look across the machine's assembly for references corresponding to the new control. Once the references are identified, the user can examine the list 310 for the specific DLL created by the project. A pointer can be set to the DLL project created. This pointer can effect the control (e.g., 304) to be placed on the toolbox for incorporation into the system. As illustrated, a check-box can be employed to identify the control that a user desires to populate onto the toolbox 310. Finally, once populated, the control can be dragged from the toolbox 312 onto a design surface 302 (e.g., form) as desired. It will be appreciated that although the aspects described herein are directed to automating the complete system and/or methodology of populating a toolbox with custom controls, it will be appreciated that the subject invention can be employed in connection with any sub-system and/or sub-methodology of the aspects described.

Figure 4:
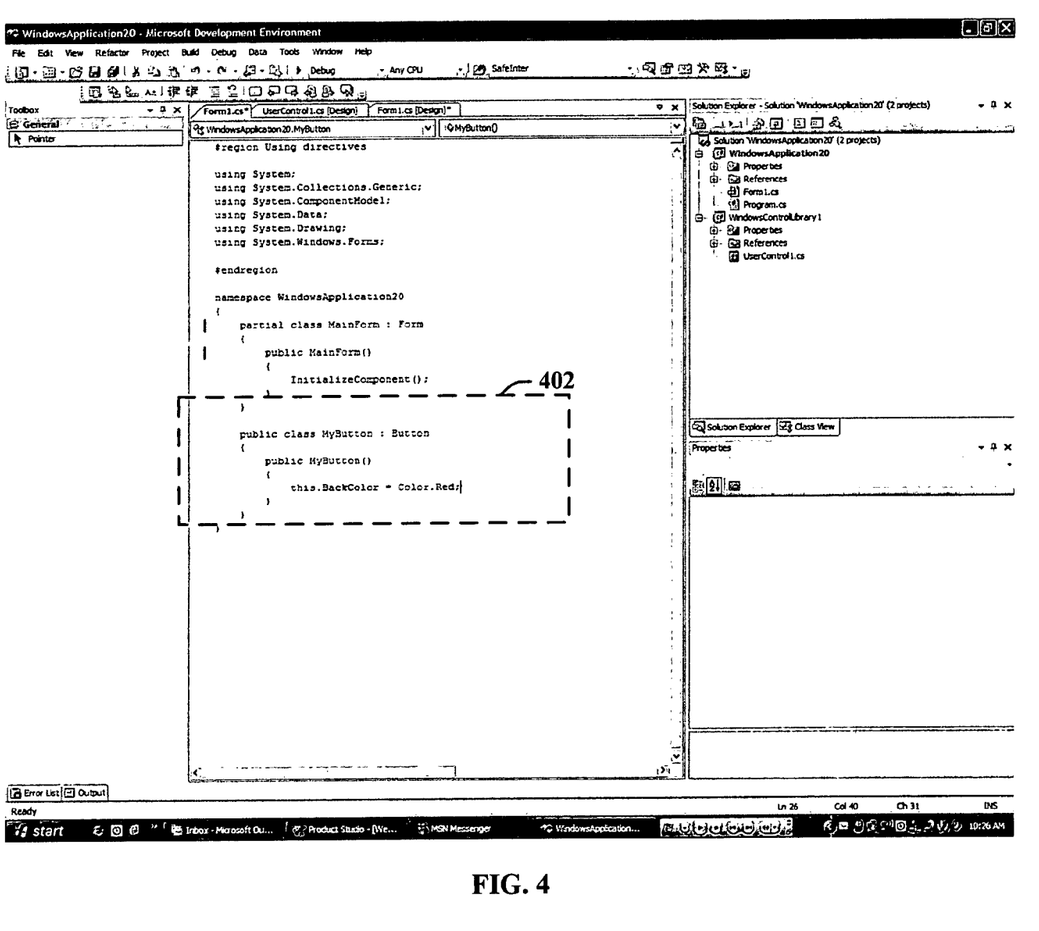
FIG. 4 illustrates a GUI that exemplifies the source code that represents a custom control in accordance with an exemplary aspect.

Referring now to FIG. 4, there is illustrated a UI graphical representation in accordance with automated aspects of the subject invention. Continuing with the example supra, a user can manipulate the project source code in order to generate or create a random custom control. By way of example and with reference to FIG. 4, a user can add a public class "MyButton" into the source code as illustrated within the dashed box 402. Additionally, the user can identify characteristics of the new control directly into the source code. For instance, as shown at 402, the user can specify that control "MyButton" will be "Color.Red." Although the example illustrates a single control generation, it is to be appreciated that the source code can be modified to include any number of desired custom components. Once the source code has been modified to identify a desired custom control (e.g., MyButton), the user can return to the form and effect the build of the binary.

Figure 5:
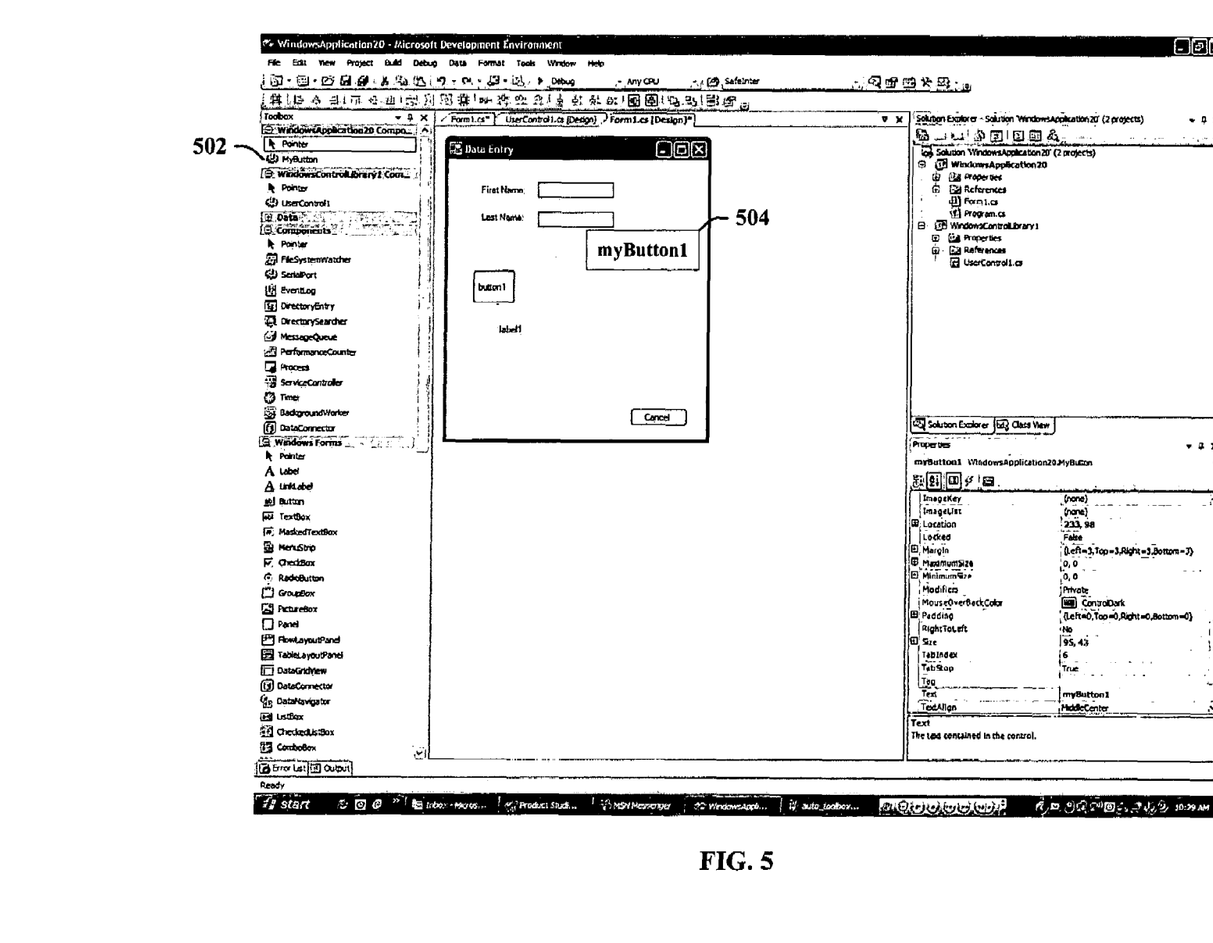
FIG. 5 illustrates a GUI that exemplifies a toolbox, design surface and form that employ a generated custom control in accordance with an exemplary aspect.

Referring now to FIG. 5, there is illustrated a UI graphical representation in accordance with the subject invention. Again, continuing with the example, once the source code has been modified to identify the control component(s), the system can automatically populate the toolbox with the custom control (e.g., MyButton) as illustrated at 502. By populating the toolbox with the new custom control, it will be understood that the user can apply the custom control to a form as desired. As illustrated in FIG. 5, the user can click on "MyButton" located in the toolbox at 502 and drag the control onto the design surface as illustrated at 504. It will be appreciated that any method can be utilized to effect the transfer in accordance with alternate aspects of the subject invention. For example, any pointing device can be employed to effect the transfer.

Figure 6:
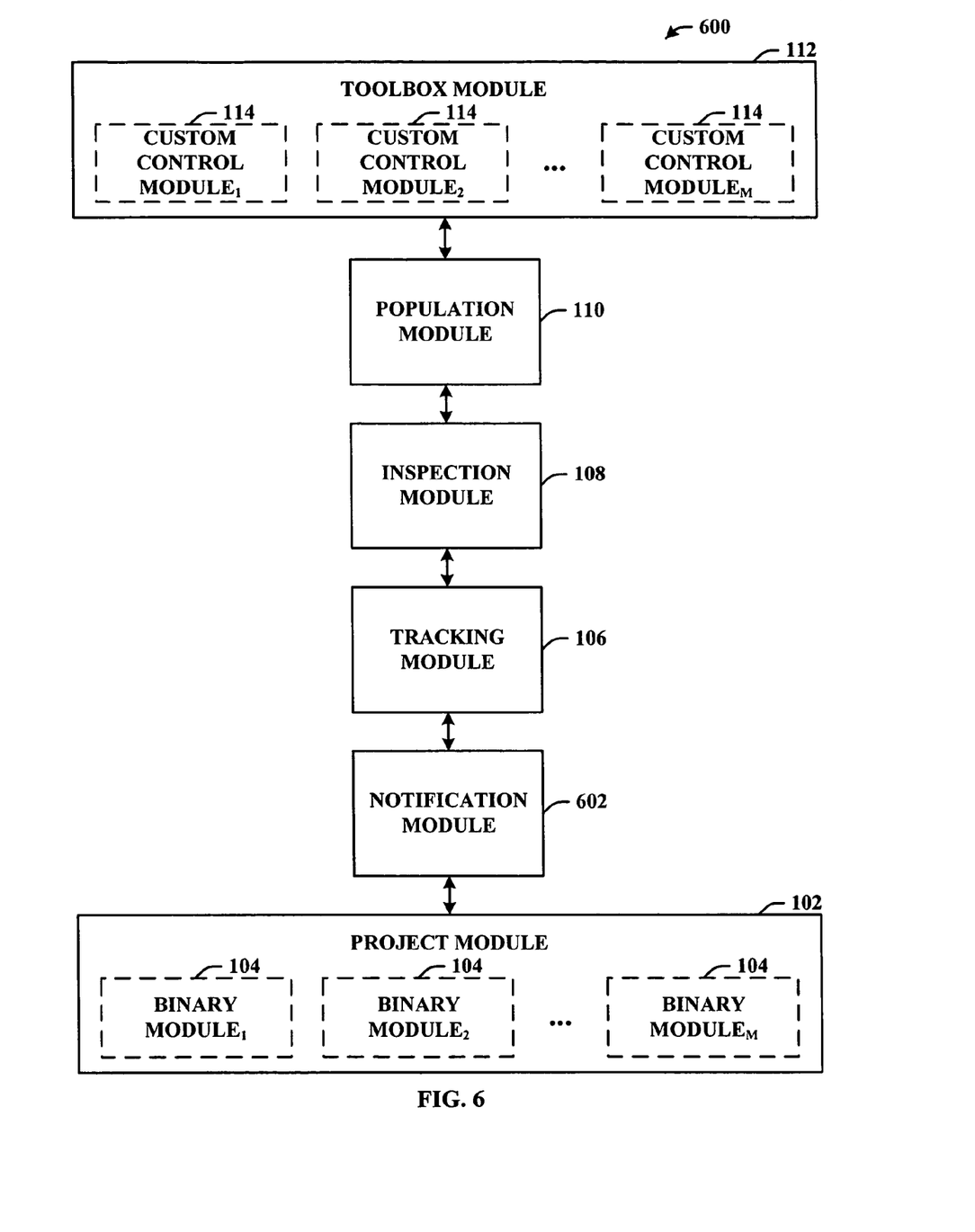
FIG. 6 illustrates an alternate general component block diagram that employs a notification component that identifies the completion of a build in accordance with an aspect.

Referring now to FIG. 6, there is illustrated a schematic representation of an aspect of a system 600 that facilitates identifying and moving components (e.g., controls) onto a design staging area (e.g., toolbox) in accordance with the subject invention. Generally, the system 600 can include a project module 102 having binary modules 104 therein. The system can further include a tracking module 106, an inspection module 108, and a population module 110. Moreover, the system can include a toolbox module 112 having custom control modules 114 therein. These components have the same or similar functionality as those described with reference to FIG. 1.

Additionally, as illustrated, the system 600 can include a notification module 602. The notification module 602 can be employed to generate a prompt or other suitable notification thus alerting the tracking module 106 of a completed build. As well, the notification module 602 can be employed to effect any notification in furtherance of the automation of system 600. In another aspect, the notification module 602 can be employed to notify the inspection module 108 of the identification of completed binaries 104. Likewise, the notification module 602 can be employed to notify the population module 110 of the identification of custom controls 114 thus further automating the system.

It will be appreciated that an alternate aspect can be employed to automatically scan project references. For example, when new assembly is added to an existing project, the system can be employed to identify any custom controls available. More particularly, the system can be employed to identify and pick up third-party controls in the situation where new assembly reference is added to a project. It is further to be appreciated and understood that the aspects described herein are exemplary and provided to add context for discussion purposes. The components and/or methodology acts can be employed in alternate scenarios without departing from the spirit and/or scope of the claimed invention.

Figure 7:
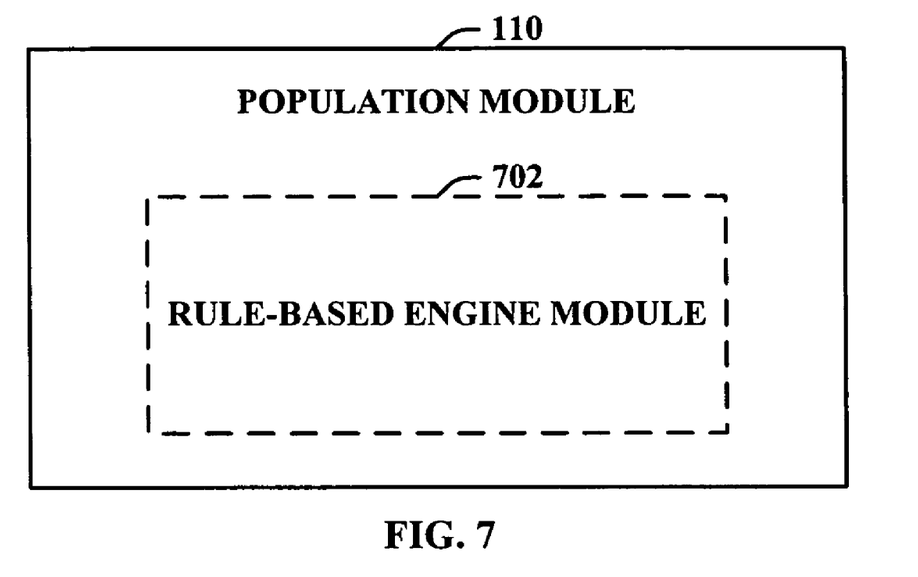
FIG. 7 illustrates a component block diagram of an alternative population component that employs a rule-based decision mechanism in accordance with an alternate aspect of the subject invention.

Continuing with the example and with reference to FIG. 7, a more detailed schematic view of the population module 110 is shown. As illustrated, population module 110 can generally include a rule-based engine module 702. As will later be described, an optional artificial intelligence (AI) component (not shown) can be used together with, or in place of, the rule-based component (e.g., 702) to automatically infer a rule or set of rules.

Figure 8:
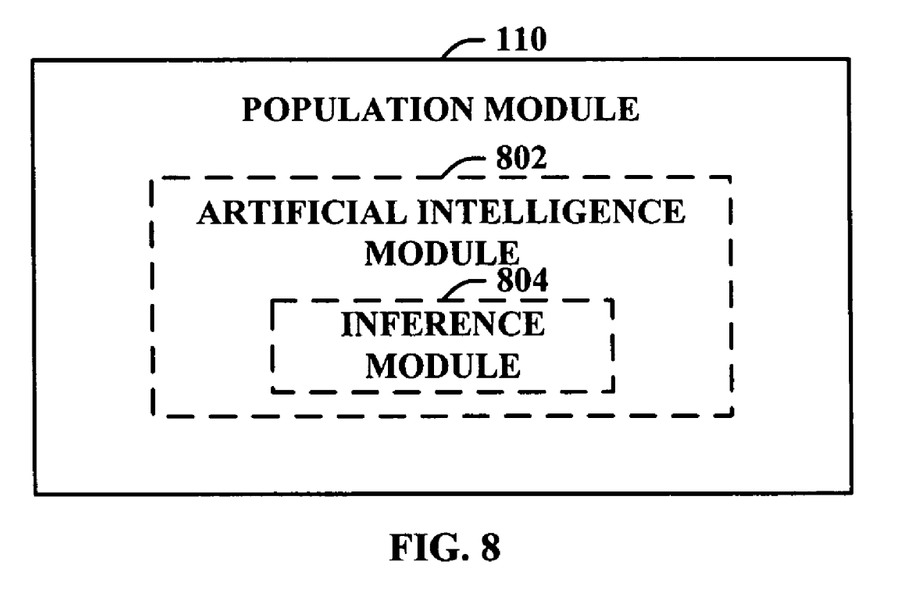
FIG. 8 illustrates a component block diagram of an alternative population component that employs artificial intelligence-based decision mechanism in accordance with an alternate aspect of the subject invention.

In the exemplary aspect of FIG. 7, the rule-based engine component 702 can be programmed or configured in accordance with a user-defined preference. As well, a rule can be established in accordance with a specific form or design surface configuration. For example, a rule can be constructed to automatically alter a control when populating the toolbox. More particularly, a rule can be established to take into consideration the specific characteristics of a design surface, space limitations, positioning, coloring, etc. when populating the toolbox. The rule-based engine 702 can facilitate application of the rule whereby the subject control can be altered accordingly. A schematic diagram of another alternative aspect of the subject invention is illustrated in FIG. 8. The population component 110 of this aspect includes an AI module 802 and an inference module 804.

In accordance with this aspect, the optional AI components 802, 804 can facilitate automatically performing various aspects (e.g., control selection, control population, control manipulation) of the subject invention as described herein. The AI component 802 can optionally include an inference component 804 that can further enhance automated aspects of the AI component utilizing, in part, inference based schemes to facilitate inferring intended actions to be performed at a given time and/or state. The AI-based aspects of the invention can be effected via any suitable machine-learning based technique and/or statistical-based techniques and/or probabilistic-based techniques.

In the alternate aspect, as further illustrated by FIG. 8, the subject invention (e.g., in connection with populating the toolbox) can optionally employ various artificial intelligence based schemes for automatically carrying out various aspects thereof. Specifically, artificial intelligence components 802, 804 can optionally be provided to implement aspects of the subject invention based upon artificial intelligence processes (e.g., confidence, inference). For example, a process for determining the controls to be populated onto a toolbox based upon characteristics of design surface, project and/or specific form can be facilitated via an automatic classifier system and process. Further, the optional artificial intelligence components 802, 804 can be employed to facilitate an automated process of population in accordance with solution characteristics whereby controls corresponding to a specific type can be associated to a solution and/or sub-toolbox (if appropriate).

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's can be configured via a learning or training phase within a classifier constructor and feature selection module. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Other implementations of AI could include alternative aspects whereby, based upon a learned or predicted user intention, the system can prompt for verifications of transfer into a toolbox. Likewise, an optional AI component could prompt a user to delete an item from a toolbox. Moreover, AI can be used to search for commonality of controls or components.

Figure 9:
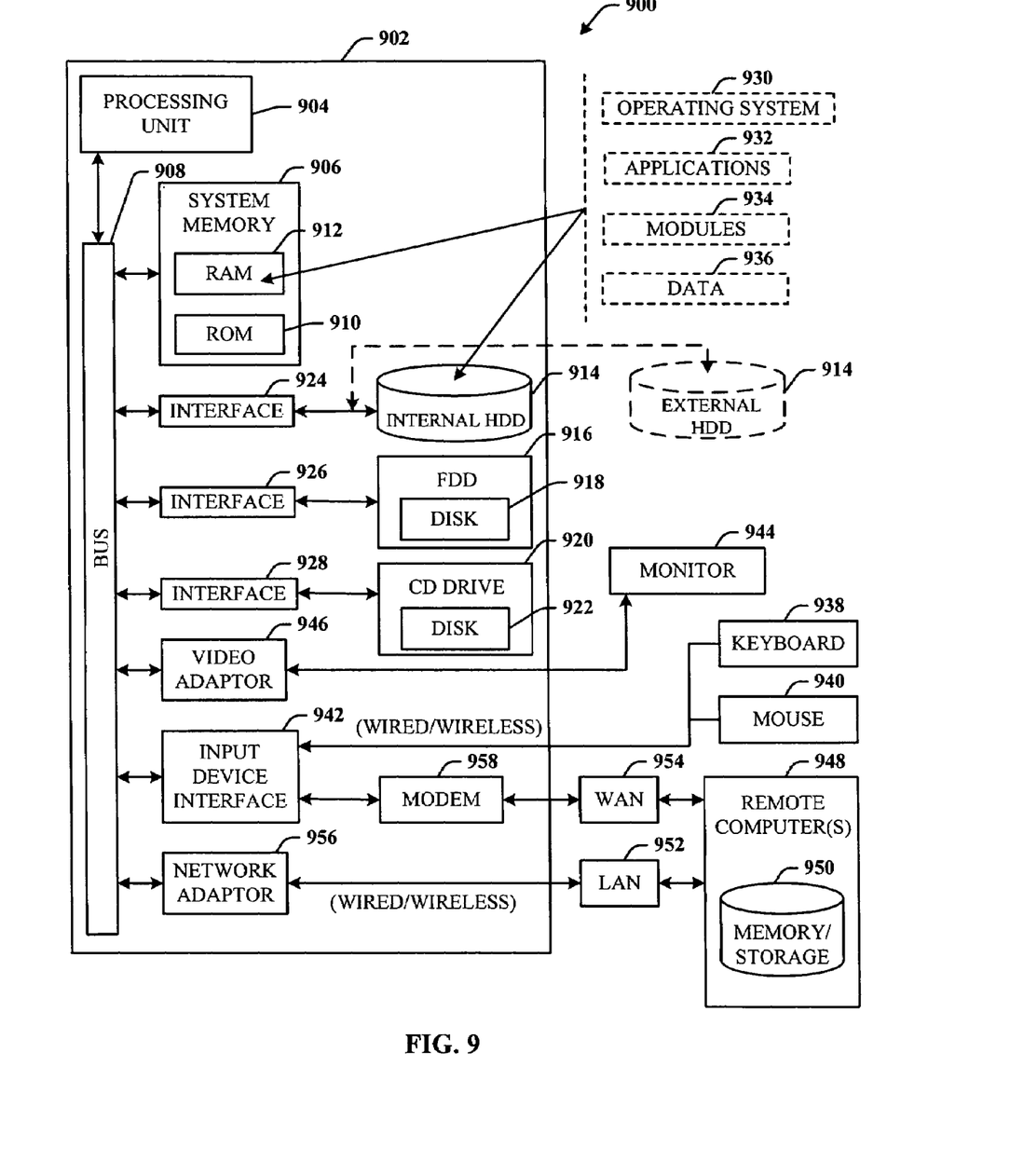
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject invention, FIG. 9 and the following discussion are intended to provide a brief, general description of a suitable computing environment 900 in which the various aspects of the subject invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media comprises computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the subject invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956. When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
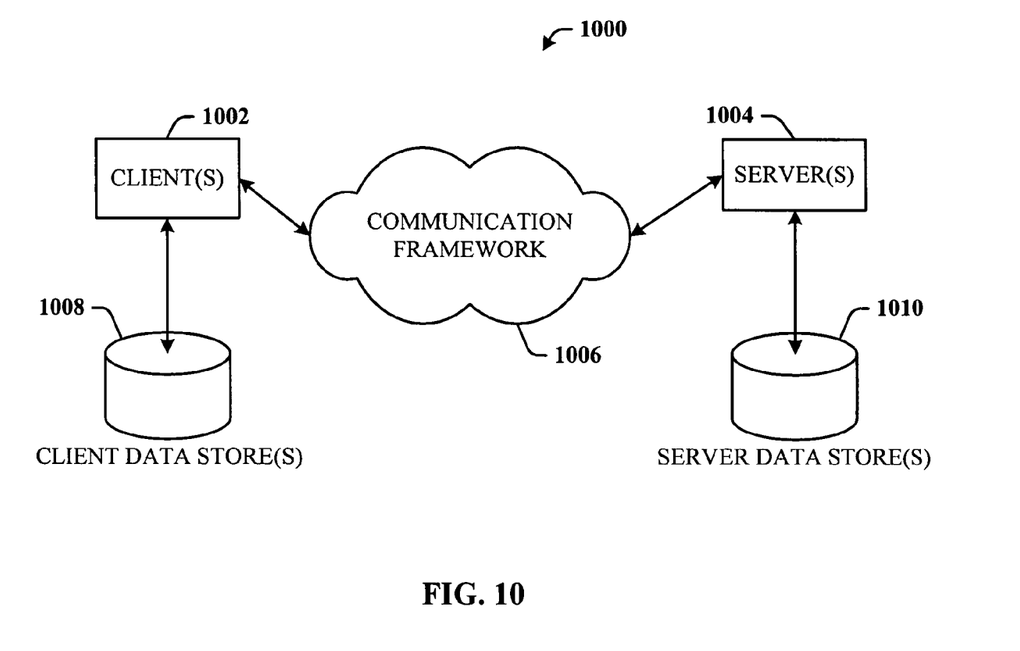
FIG. 10 illustrates a schematic block diagram of an exemplary computing environment in accordance with the subject invention.

Referring now to FIG. 10, there is illustrated a schematic block diagram of an exemplary computing environment 1000 in accordance with the subject invention. The system 1000 includes one or more client(s) 1002. The client(s) 1002 can be hardware and/or software (e.g., threads, processes, computing devices). The client(s) 1002 can house cookie(s) and/or associated contextual information by employing the subject invention, for example. The system 1000 also includes one or more server(s) 1004. The server(s) 1004 can also be hardware and/or software (e.g., threads, processes, computing devices). The servers 1004 can house threads to perform transformations by employing the subject invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A tangible computer-readable storage medium encoded with a computer program for a system that adds components to a visual designer toolbox, the system comprising:
   a tracking module that tracks a project system for an indication that a binary file has been compiled and which can receive an indication that the binary file has been compiled;
   an inspection module that inspects the compiled binary file to determine if the compiled binary file comprises components that can be added to the visual designer toolbox; and
   a population module that, upon the inspection module determining the compiled binary file comprises components that can be added to the visual designer toolbox, automatically adds the components to the visual designer toolbox;
   wherein the population module includes a rule-based engine module that populates the visual designer toolbox in accordance with at least one rule,
   the rule-based engine selecting rules from a set of rules,
   the set of rules established in accordance with a specific form or design surface configuration, and the set of rules established to take into consideration specific characteristics of a design surface, space limitations, positioning, or coloring; and
   wherein the population module further includes an artificial intelligence (AI) module that automatically infers at least one rule in determining at least one component to be populated on the visual designer toolbox.

2. The system of claim 1, the binary file is a binary program.

3. The system of claim 1, the binary file is application-generated code.

4. The system of claim 1, further comprising a notification module that generates the indication that the binary file has been compiled.

5. The system of claim 4, the notification module operates on a user defined timing sequence for determining if new controls are available for inspection.

6. The system of claim 1, further comprising an analyzing module that analyzes the component to determine a state of the component.

7. The system of claim 6, further comprising a load module that loads assembly code that instantiates the component as a function of the state.

8. The system of claim 7, the load module ensures that other components are not dropped from other projects if a project reference cannot be created.

9. The system of claim 1, the AI component comprises an inference component that infers the user action as a function of historical user criteria.

10. The system of claim 9, the inference component employs utility-based analyses in performing the inference.

11. The system of claim 1, the AI component employs a statistical-based analysis to infer an action that the user desires to be automatically performed.

12. The system of claim 1, the inspection module can determine that the component should be replaced in or removed from the visual designer toolbox.

13. The system of claim 1, the population module can remove the component from the visual designer toolbox based on a determination by the inspection component.

14. The system of claim 1, the population module can replace the component in the visual designer toolbox based on a determination by the inspection component of a change in component version number.

15. The system of claim 1, the population module further comprises an update module that prompts the user for confirmation before automatically updating the visual designer toolbox.

16. The system of claim 1, the predetermined rule comprises modifying the component before updating the visual designer toolbox with the component.

17. The system of claim 1, the tracking module can also track one of source, assembly and machine code for the indication.

18. A method of updating a visual designer toolbox, the method comprising:
   tracking a project system for a prompt, the prompt indicating that a binary file has been compiled;
   receiving the prompt indicating that the binary file has been compiled;
   inspecting the compiled binary file to determine if the compiled binary file comprises components that can be added to the visual designer toolbox;
   the inspection of the compiled binary file identifying components that can be added to the visual designer toolbox; and
   a population module that, upon the inspection determined that the compiled binary file comprises components that can be added to the visual designer toolbox, automatically updates the visual designer toolbox with the identified components;
   wherein the population module includes a rule-based engine module that populates the visual designer toolbox in accordance with at least one rule,
   the rule-based engine selecting rules from a set of rules,
   the set of rules established in accordance with a specific form or design surface configuration, and the set of rules established to take into consideration specific characteristics of a design surface, space limitations, positioning, or coloring; and
   wherein the population module further includes an artificial intelligence (AI) module that automatically infers at least one rule in determining at least one component to be populated on the visual designer toolbox.

19. The method of claim 18, further comprising programming the binary that specifies the component.

20. The method of claim 19, the act of programming is performed manually by a user.

21. The method of claim 18, further comprising generating the prompt that indicates the binary has been built.

22. The method of claim 18, further comprising determining a state of the component and loading the component as a function of the state.

23. The method of claim 18, the act of automatically updating the visual designer toolbox comprises implementing a predetermined rule that specifies an updating criteria.

24. The method of claim 18, the act of automatically updating the visual designer toolbox comprises inferring a user intention and updating the visual designer toolbox in accordance with the act of inferring.

25. The method of claim 18, the act of updating the visual designer toolbox comprises removing the component.

26. The method of claim 18, the act of automatically updating the visual designer toolbox with the component comprises replacing an existing component with a newer component based on component version number.

27. The method of claim 18, the act of automatically updating the visual designer toolbox with the component comprises prompting for confirmation before updating the component on the visual designer toolbox.

* * * * *